United States Patent
Böttger et al.

(10) Patent No.: US 9,951,456 B2
(45) Date of Patent: Apr. 24, 2018

(54) ARRANGEMENT HAVING A WASHING-MACHINE TUB AND A DRIVE MOTOR, AND WASHING MACHINE

(75) Inventors: Torsten Böttger, Radebeul (DE); Wolfram Schubert, Stralsund (DE); Jörg Skrippek, Wustermark (DE)

(73) Assignee: BSH Hausgeräte GmbH, Munich (DE)

( * ) Notice: Subject to any disclaimer, the term of this patent is extended or adjusted under 35 U.S.C. 154(b) by 364 days.

(21) Appl. No.: 14/347,814

(22) PCT Filed: Sep. 14, 2012

(86) PCT No.: PCT/EP2012/068123
§ 371 (c)(1),
(2), (4) Date: Jun. 13, 2014

(87) PCT Pub. No.: WO2013/045296
PCT Pub. Date: Apr. 4, 2013

(65) Prior Publication Data
US 2014/0305171 A1    Oct. 16, 2014

(30) Foreign Application Priority Data
Sep. 28, 2011   (DE) .......................... 10 2011 083 652

(51) Int. Cl.
*D06F 37/20*   (2006.01)
*H02K 5/26*   (2006.01)
*H02K 5/04*   (2006.01)

(52) U.S. Cl.
CPC ............ *D06F 37/206* (2013.01); *D06F 37/20* (2013.01); *H02K 5/04* (2013.01); *H02K 5/26* (2013.01)

(58) Field of Classification Search
CPC ....... D06F 37/206; D06F 37/262; D06F 37/30
See application file for complete search history.

(56) References Cited

U.S. PATENT DOCUMENTS

| 4,922,151 A | 5/1990 | Lewis |
| 2004/0084602 A1* | 5/2004 | Heyder ................. D06F 37/206 248/674 |
| 2006/0218974 A1 | 10/2006 | Marioni |
| 2007/0063603 A1* | 3/2007 | Levine ................. D06F 37/206 310/85 |

(Continued)

FOREIGN PATENT DOCUMENTS

| CN | 2427543 | 4/2001 |
| CN | 1936151 | 3/2007 |

(Continued)

OTHER PUBLICATIONS

International Search Report for PCT/EP2012/068123 dated Jan. 10, 2013.

(Continued)

*Primary Examiner* — Spencer E Bell
(74) *Attorney, Agent, or Firm* — Nixon & Vanderhye P.C.

(57) ABSTRACT

The invention relates to an arrangement having a washing-machine tub and a drive motor, which can be connected to the tub by a suspension device, wherein the suspension device is designed as a two-point attachment means, wherein a housing of the drive motor has arranged on it two rockers designed for connection in each case to a rocker mount arranged on the tub. The invention also relates to a washing machine having such an arrangement.

15 Claims, 1 Drawing Sheet

(56) References Cited

U.S. PATENT DOCUMENTS

Figure 1:
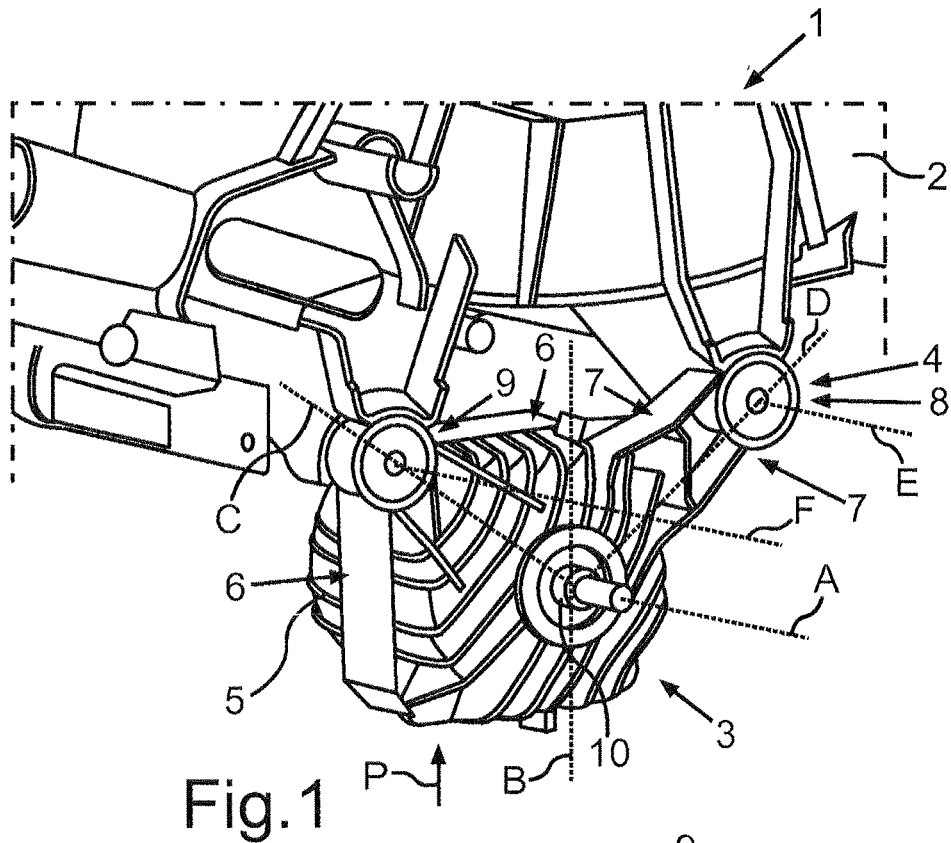

2009/0096305 A1* 4/2009 Marioni ................ D06F 37/304
                                                    310/91
2010/0307201 A1* 12/2010 Shiga .................... D06F 37/304
                                                    68/140
2011/0113833 A1* 5/2011 Borque Marquina D06F 37/262
                                                    68/140

FOREIGN PATENT DOCUMENTS

| | | |
|---|---|---|
| DE | 2126092 A1 | 11/1972 |
| DE | 689 15 637 | 9/1994 |
| EP | 0 750 064 | 12/1996 |
| EP | 1 424 427 | 6/2004 |
| EP | 1 707 660 | 10/2006 |
| GB | 2 104 110 | 3/1983 |

OTHER PUBLICATIONS

Written Opinion of the International Searching Authority dated Jan. 10, 2013.

* cited by examiner

ARRANGEMENT HAVING A WASHING-MACHINE TUB AND A DRIVE MOTOR, AND WASHING MACHINE

This application is the U.S. national phase of International Application No. PCT/EP2012/068123 filed 14 Sep. 2012 which designated the U.S. and claims priority to DE 10 2011 083 652.7 filed 28 Sep. 2011, the entire contents of each of which are hereby incorporated by reference.

The invention relates to an arrangement comprising a washing machine tub and a drive motor which can be connected to the tub via a suspension device, wherein the suspension device is implemented as a 2-point connection. The invention also relates to a washing machine having such an arrangement.

EP 1 424 427 A1 discloses a washing machine, wherein the tub has two extensions to which four extensions of the motor housing are mounted such that that two pairs of extensions can be directly interconnected on the drive side. The two remaining extensions of the motor housing can be connected via an intermediate piece to the single corresponding extension on the tub, which intermediate piece has pins pointing toward the extensions on the motor housing and is mounted with a pin pointing in the opposite direction in a hole in the tub-side extension. Said intermediate piece indeed contributes to general tolerance compensation and vibration damping. However, as it is thus subjected to very heavy cyclic loads particularly during washing machine spins, there is a greater likelihood of the intermediate piece breaking, resulting in immediate total failure of the washing machine in question.

In addition, EP 1 707 660 A1 discloses an arrangement wherein a tub has arms designed to accommodate a motor shaft. A first end of said shaft is attached to a first arm, the opposite end of the shaft being attached to the second arm. The shaft axis is therefore always oriented parallel to or more precisely coaxial with a straight line connecting the two arms. In this respect the mounting of the motor is unsatisfactory in terms of accessibility and assembly. A 2-point connection is therefore disadvantageous for low wear of the motor, particularly the shaft.

The object of the present invention is to create an arrangement and a washing machine wherein the 2-point connection of a motor to the tub is improved.

This object is achieved by an arrangement and a washing machine as claimed in the respective independent claim. Preferred and advantageous embodiments of the invention are set forth in dependent claims, the following description and the figures of the accompanying drawing, wherein preferred embodiments of the arrangement correspond to preferred embodiments of the washing machine and vice versa, even if this is not explicitly stated herein.

In an inventive arrangement it is accordingly provided that said arrangement comprises a washing machine tub and a drive motor. The drive motor is connected to the tub by means of a suspension device, said suspension device being implemented as a 2-point connection. This means that the drive motor is mechanically fastened to the tub via two connection points only. Disposed on the drive motor housing are two rockers which are designed for connection to a tub-side rocker mount in each case.

Such a design means that the drive motor is no longer connected to the tub by being fastened directly via the drive shaft, but via parts that are spaced apart therefrom and separate therefrom. This avoids the above mentioned disadvantages.

It is preferably provided that the rockers are disposed at an angle with respect to a perpendicular bisector of the drive motor, in particular at an angle of between 30 and 60°. This angling of the rockers on the one hand enables a particularly stable mechanical concept to be implemented which, in addition, also constitutes a compact and space-saving design. In particular, it is thus provided that the two rockers are disposed in a V-shape.

It is preferably provided that an axis of a shaft of the drive motor and axes of the rocker mounts are not disposed coaxially to one another. In particular, the rocker mount axes are those which run through the center of the connection point, e.g. the center of a rocker mount hole designed to accommodate fastening elements.

The three axes are preferably oriented parallel to one another.

It is preferably provided that, when the rockers and the rocker mounts are in the connected state, a straight line connecting rocker mount axes is oriented at an angle greater than 0°, in particular an angle of 90°, with respect to the axis of the drive motor shaft.

It is preferably provided that, when the rockers and the rocker mounts are in the connected state, a straight line connecting mount axes is oriented running though a ball bearing of the drive motor.

The straight connecting line is preferably disposed standing perpendicularly on the axis of the ball bearing, so that said connecting line is disposed effectively in line with the ball bearing. In particular, this is particularly advantageous in that, with respect to the weight distribution, the forces acting on the connection points when the motor is in motion can thus be minimized. Therefore an optimized center of gravity position can also be generated.

It is preferably provided that the rocker mounts are implemented at least sectionally as plastic sleeves. This enables an extremely weight-saving design to be realized.

It is particularly advantageous if the tub is fiber glass reinforced or made of duroplastic material at least in the area of the rocker mounts. This can provide, particularly in the region of the connection, an extremely stable tub which makes possible and durably maintains the quite specific 2-point connection.

It is preferably provided that the drive motor is BLDC (brushless DC) motor, also known as a PMS (permanent magnet synchronous) motor. This is particularly advantageous in that a motor of this kind is light-weight compared to other motors such as a universal motor, for example. Particularly using such a specific type of motor can again benefit the 2-point connection.

It is preferably provided that the drive motor is screwed to the tub. In particular, fastening it to the tub with screws can therefore be effected by means of an additional plastic section, in particular via the rockers and rocker mounts.

The arrangement according to the invention or one of the advantageous embodiments thereof now obviates the need for motor mounting brackets on the tub or rather enables them to be used for other functions or components.

Figure 2:
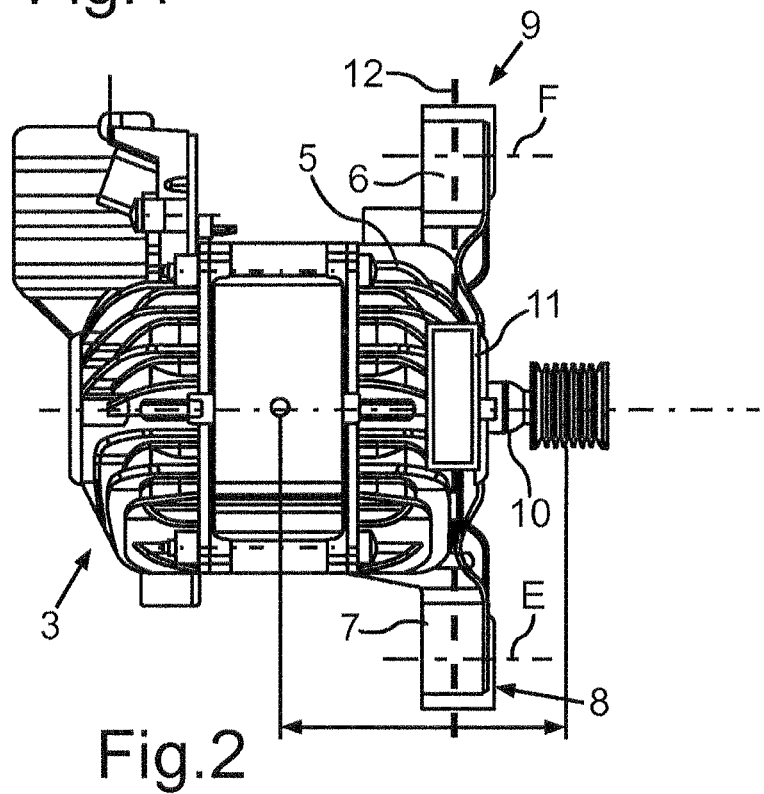

A preferred exemplary embodiment of the invention will now be explained in greater detail with reference to the accompanying schematics in which:

FIG. 1 shows a perspective view of an exemplary embodiment of an arrangement comprising a tub and a drive motor; and FIG. 2 shows a view from below of an exemplary embodiment of the drive motor of the arrangement shown in FIG. 1.

In the figures, identical or functionally identical elements are provided with the same reference characters in each case.

FIG. 1 shows a perspective view of an arrangement 1 which is installed in a washing machine. The arrangement 1 comprises a tub 2 and a drive motor 3 which is implemented as a BLDC motor in the example. The drive motor 3 is connected to the tub 2 via a suspension device 4 which is implemented as a 2-point connection. The drive motor 3 comprises a housing 5 on which two rockers 6 and 7 are integrally molded.

The tub 2 additionally comprises two rocker mounts 8 and 9 to which the rockers 6 and 7 can be connected or are connected as in FIG. 1. The rocker mounts 8 and 9 and/or the rockers 6 and 7 can be at least partially made of plastic material. In particular, it is provided that the rockers 6 and 7 are fastened to the rocker mounts 8 and 9 by means of screws.

As can also be seen from FIG. 1, the drive motor 3 has a shaft 10 having an axis A. Shown running vertically with respect to said axis A in FIG. 1 is a perpendicular bisector B of the drive motor 3. As can be seen, the two rockers 6 and 7 essentially form a V-shape, so that each rocker 6 and 7 with its respective longitudinal axis C and D is at an angle of between 30 and 600 with respect to the perpendicular bisector B. It can also be seen that axes E and F of the rocker mounts 8 and 9 are not coaxial with the axis A, but are in particular disposed parallel thereto. If the axes A. E and F are each connected by straight lines perpendicular thereto, effectively a triangle is formed.

FIG. 2 shows the drive motor 3 viewed from below. This is therefore the view in the direction of the arrow P in FIG. 1. The non-coaxial but parallel orientation of the axes A, E and F can be seen. It is additionally provided that the rockers 6 and 7 are disposed on the housing 5 such that, in the direction of the axis A, they are positioned at the same level as the ball bearing 11 of the motor 3. This means that the suspension points are in line with the ball bearing 11. A straight connecting line 12 therefore runs at the level of the ball bearing 11 when viewed in the direction of the axis A, said connecting line 12 being drawn as an imaginary connection running between the rockers 6, 7 or more precisely the rocker mounts 8, 9.

Particular advantageousness results from this quite specifically implemented 2-point connection in conjunction with the fiber glass reinforced tub 2 or a tub 2 made at least partly of a duroplastic material and the drive motor 3 implemented as a BLDC motor.

LIST OF REFERENCE CHARACTERS 1 arrangement
2 tub
3 drive motor
4 suspension device
5 housing
6,7 rockers
8,9 rocker mounts
10 shaft
11 ball bearing
12 straight connecting line

The invention claimed is:

1. A washing machine system comprising a tub and a drive motor connected to the tub using a suspension device, wherein the suspension device is connected to the tub at two connection points only, wherein two links are connected to tub-side link mounts disposed on a housing of the drive motor, wherein the links, with respect to the direction of an axis of a shaft of the drive motor, are disposed at the level of a ball bearing of the drive motor such that the links and the ball bearing are all within a plane perpendicular to the axis to minimize forces acting on the connection points due to weight distribution when the drive motor is in motion.

2. The washing machine system as claimed in claim 1, wherein the links are disposed at an angle with respect to a bisector of the drive motor which is perpendicular to the axis.

3. The washing machine system of claim 2, wherein the links are disposed at an angle between 30° and 60° with respect to the bisector of the drive motor.

4. The washing machine system as claimed in claim 1, wherein an axis (A) of a shaft of the drive motor and axes of the links mounts are not disposed coaxially.

5. The washing machine system as claimed in claim 4, wherein an axis of the shaft and the axes of the link mounts are oriented parallel to one another.

6. The washing machine system as claimed in claim 1, wherein a straight line connecting axes of the link mounts is perpendicular to the axis of a shaft of the drive motor with respect to a view normal to the axis of the shaft of the drive motor.

7. The washing machine system as claimed in claim 1, wherein the link mounts are plastic sleeves.

8. The washing machine system as claimed in claim 1, wherein the tub is fiber glass reinforced or made of duroplastic material at least in a region of the link mounts.

9. The washing machine system as claimed in claim 1, wherein the drive motor is a BLDC motor.

10. The washing machine system as claimed in claim 1, wherein the drive motor is screwed to the tub.

11. A washing machine comprising the washing machine system as claimed in claim 1.

12. The washing machine system of claim 1, wherein, with respect to the direction of the axis of the shaft of the drive motor, a longitudinal center line of the links is disposed substantially aligned with a longitudinal center line of the ball bearing.

13. The washing machine system of claim 1, wherein, with respect to the direction of the axis of the shaft of the drive motor, a longitudinal center line of the link mounts is disposed substantially aligned with a longitudinal center line of the ball bearing.

14. The washing machine system of claim 1, wherein, with respect to the direction of the axis of the shaft of the drive motor, a longitudinal center line of both the links and the links mounts is disposed substantially aligned with a longitudinal center line of the ball bearing.

15. The washing machine system of claim 1, wherein the links and the ball bearing are aligned in the plane perpendicular to the axis.

* * * * *